United States Patent
Ali (10) Patent No.: US 12,039,393 B2
(45) Date of Patent: Jul. 16, 2024

(54) MANUFACTURE OF A HYBRID CONTACTLESS CHIP CARD WITH SMDs AND EMBEDDED NFC

(71) Applicant: IDEMIA FRANCE, Courbevoie (FR)

(72) Inventor: Ahmed Ali, Haarlem (NL)

(73) Assignee: IDEMIA FRANCE, Courbevoie (FR)

( * ) Notice: Subject to any disclaimer, the term of this patent is extended or adjusted under 35 U.S.C. 154(b) by 0 days.

(21) Appl. No.: 18/157,333

(22) Filed: Jan. 20, 2023

(65) Prior Publication Data
US 2023/0419072 A1    Dec. 28, 2023

(30) Foreign Application Priority Data

Jun. 22, 2022   (FR) ...................... 22 06206

(51) Int. Cl.
*G06K 19/077* (2006.01)
*H02M 7/06* (2006.01)

(52) U.S. Cl.
CPC ........ *G06K 19/07773* (2013.01); *H02M 7/06* (2013.01)

(58) Field of Classification Search
CPC ............ G06K 19/07773; G06K 19/07; G06K 19/067; G06Q 20/34; G06Q 20/341; H02M 7/06
USPC ................................ 235/492, 380, 487, 375
See application file for complete search history.

(56) References Cited

U.S. PATENT DOCUMENTS

| 6,134,130 A | 10/2000 | Connell et al. |
| 11,694,050 B2 * | 7/2023 | Suh .................... G06K 19/0701 340/10.34 |
| 2010/0276497 A1 | 11/2010 | Seban et al. |
| 2021/0259096 A1 | 8/2021 | Diaz et al. |
| 2021/0406633 A1 * | 12/2021 | Lee .................... G06K 19/0718 |

FOREIGN PATENT DOCUMENTS

| CN | 107358286 A | * 11/2017 |
| EP | 3 651 068 A1 | 5/2020 |
| GB | 2574668 A | 12/2019 |

(Continued)

OTHER PUBLICATIONS

France Preliminary Search Report and Written Opinion issued Jan. 26, 2023 in FR2206206, 9 pages.

*Primary Examiner* — Edwyn Labaze
(74) *Attorney, Agent, or Firm* — Oblon, McClelland, Maier & Neustadt, L.L.P.

(57) ABSTRACT

A method for manufacturing a contactless chip card that makes provision to obtain a voltage-rectifying-circuit-forming printed-circuit module incorporating one or more SMDs forming a full-wave bridge rectifier, to place this module in a punch provided in a conventional chip-card substrate, then, to form an NFC wire radiofrequency antenna by embedding a conductive wire in the bulk of the substrate, the ends of which are soldered to input terminals of the module. Other electronic modules operating on DC currents are then easily integrated into the card, electrical links with the rectifier module also being produced by embedding an electrical wire in the bulk of the substrate. The disclosure advantageously allows the combination of low cost embedding of a conductive wire by ultrasound to form a radiofrequency antenna and the flexibility of use of SMDs.

19 Claims, 7 Drawing Sheets

(56) References Cited

FOREIGN PATENT DOCUMENTS

| | | | | | |
|---|---|---|---|---|---|
| JP | 2004118440 | A | * | 4/2004 | ......... G06K 7/10316 |
| JP | 2005100357 | A | * | 4/2005 | |
| JP | 2007334660 | A | * | 12/2007 | |
| WO | WO 2009/077347 | A1 | | 6/2009 | |

* cited by examiner

MANUFACTURE OF A HYBRID CONTACTLESS CHIP CARD WITH SMDs AND EMBEDDED NFC

CROSS-REFERENCE TO RELATED APPLICATION

The present application claims priority to French Patent Application No. 22 06206, filed on Jun. 22, 2022. The benefit of priority is claimed to each of the foregoing, and the entire contents of each of the foregoing are incorporated herein by reference.

FIELD OF THE INVENTION

The invention relates to contactless chip cards equipped with surface-mount devices.

PRIOR ART

Memory- or microprocessor-comprising contactless chip cards are used in an increasing number of applications, such as access control (buildings, public transport, events, etc.) or payment. They mainly use the radiofrequency (RF) technology near-field communication or NFC, which is especially defined through standards NFCIP-1 (ISO/IEC 18092) and ISO/IEC 14443.

NFC cards have been widely deployed because of their low manufacturing cost and their ease of use. Their low manufacturing cost is partially due to the use of a wire antenna that is embedded in or integrated into the substrate of the card, generally using an ultrasound technique.

One current tendency is to incorporate new electronic components in NFC chip cards, especially light-emitting components such as light-emitting diodes (LEDs) or organic light-emitting diodes (OLEDs) and their controllers. These light sources may for example act as user interface.

A non-negligible proportion of these new integrated components are surface-mount devices, i.e. components that are soldered directly to the surface of a printed circuit board, in contrast to conventional components the pins of which pass through the printed circuit board and are then soldered subsequently. Surface-mount devices (SMDs) have many advantages: miniaturization, simpler circuit boards, improved device density, low cost, etc.

Nevertheless, SMDs appear incompatible with conventional NFC cards in which the wire antenna is embedded in the substrate of the card. Specifically, at the high soldering temperatures of SMDs, the substrate, which is typically made of plastic (ABS—acrylonitrile butadiene styrene, PVC—polyvinyl chloride, PC—polycarbonate, PET—polyethylene terephthalate, PEEK—polyetheretherketone, PEN—polyethylene naphthalate), melts. Thus, SMDs are mounted on a conventional printed circuit board that is more resistant to heat (fibrous material such as FR4, or PI—polyimide).

It is therefore conventional, in the presence of SMDs, to provide a conventional NFC antenna, i.e. one directly printed on or etched into the printed circuit board. This solution is unsatisfactory, especially because the associated manufacturing cost is higher, but also because of the larger thickness of the obtained card.

There is thus a need for new techniques allowing surface-mount devices to be integrated into contactless chip cards.

SUMMARY OF THE INVENTION

To this end, the invention relates to a process for manufacturing a contactless chip card typically of the type employing near-field communication (NFC), comprising the following steps:

obtaining a voltage-rectifying-circuit-forming printed-circuit module incorporating one or more surface-mount devices, placing the voltage-rectifying-circuit-forming printed-circuit module in a punch of same size provided in a substrate, then, forming, by embedding conductive wires in the bulk of the substrate, a wire radiofrequency antenna the ends of which are soldered to (input) terminals associated with the voltage-rectifying-circuit-forming printed-circuit module, and electrical links between the voltage-rectifying-circuit-forming printed-circuit module and one or more active-device modules.

By "module" or "printed-circuit module", what is meant is a printed circuit board (PCB) of smaller size with respect to the substrate, such that it is able to be incorporated into the thickness of the substrate, in a dedicated punch or hole.

By "embed", what is further meant is the fact that the conductive wire is encapsulated in the (generally plastic) bulk of the substrate. Conventional techniques for embedding a conductive wire are based on ultrasound. The substrate used is therefore suitable for such a technique, and therefore able to soften and deform under the action of ultrasound.

By "active-device module", what is meant is a module comprising one or more active electronic devices/components. An active electronic device is typically, but not necessarily, a semiconductor component, for example an LED or OLED or a micro-sensor.

A chip card thus produced is not necessarily finished, but may be "semi-finished", i.e. require other finishing steps, such as for example the incorporation of other electronic components (chip, memory), and lamination of protective and personalizing layers.

By mounting the SMDs on a dedicated module, it is possible to integrate the latter into the substrate before the wire antenna is produced. The soldering of the SMDs is thus always carried out away from the substrate dedicated to the ultrasound embedment. Therefore, the process makes it possible to produce a hybrid chip card benefiting both from the low manufacturing cost of antennas formed by ultrasound embedment, and from the wide variety of SMDs, which allows higher levels of integration to be obtained.

Further, use of such a dedicated voltage-rectifying-circuit-forming module advantageously allows one or more active devices operating on DC current (or the like) to be more easily integrated into the card. Specifically, it is enough to connect each of these devices to the voltage-rectifying-circuit-forming printed-circuit module.

Preferably, a conductive wire forming the electrical link to an active-device module is embedded in the same step as the wire radiofrequency antenna is embedded.

Correlatively, the invention also relates to a contactless chip card of the type employing near-field communication (NFC), comprising:
- a substrate,
- a voltage-rectifying-circuit-forming printed-circuit module incorporating one or more surface-mount devices and placed in a punch of same size provided in the substrate, and
- one or more active-device modules, wherein a wire radiofrequency antenna is formed from a conductive wire embedded in the bulk of the substrate and the ends of which are soldered to terminals associated with the voltage-rectifying-circuit-forming printed-circuit module, and, wherein electrical links are formed between the voltage-rectifying-circuit-forming printed-circuit module and one or more active-device modules, by conductive wires embedded in the bulk of the substrate.

Optional features of the embodiments of the invention are defined in the appended claims. Certain of these features are explained below with reference to a process, though they may be transposed into device features.

In one embodiment, the voltage-rectifying-circuit-forming printed-circuit module is devoid of memory or microprocessor or microcontroller. Thus, the risk of these components being degraded by the thermal stresses generated when the SMDs are soldered to the module is avoided. In other words, the printed-circuit module may be dedicated to a single simple electronic function, performed using SMDs.

In particular, the surface-mount devices form a full-wave bridge rectifier.

In one embodiment, the formation of the wire radiofrequency antenna comprises embedding a conductive wire in the bulk of the substrate, the ends of the conductive wire being placed on the terminals associated with the printed-circuit module, then soldered to said terminals.

Though one end of the wire forming the electrical link to an active-device module may be placed on an (output) terminal associated with the voltage-rectifying-circuit-forming printed-circuit module, then soldered to said terminal, the other end of the wire forming the link may be placed on a dedicated terminal of the active-device module, then soldered to said terminal. In this case, one of the active-device modules is placed in a punch provided to this end in the substrate, before embedment of a conductive wire forming the electrical link with the voltage-rectifying-circuit-forming printed-circuit module. This active-device module may also comprise SMDs.

In one variant of design that may be applicable when another active-device module is used, the electrical-link-forming conductive wire may be embedded before this other active-device module is placed in the substrate. In this case, one end of an embedded conductive wire forming one electrical link is laid bare (the insulator forming the substrate is removed by any known means, especially a mechanical means, machining, milling, laser removal, chemical removal, etc.) in a cavity of the substrate before one of the active-device modules is placed therein. The electrical connection may especially be achieved with a connecting material such as ACF or ACP (ACF standing for anisotropic conductive film and ACP standing for anisotropic conductive paste) or any other type of conductive paste, or even by direct soldering in the case where the active device or component is borne by a PCB.

By virtue of these variants, it is possible to achieve hybrid integration of a high number of active-device modules using a single rectifier circuit in the card, and especially hybrid integration of an LED module soldered directly to the embedded wire and of an OLED module bonded by ACF bonding. The active-device modules then comprise at least one light-emitting diode, which may be organic or not.

BRIEF DESCRIPTION OF THE DRAWINGS

Other particularities and advantages of the invention will become more clearly apparent from the following description, which is illustrated by the appended figures, which illustrate non-limiting examples of embodiment thereof.

DETAILED DESCRIPTION

A process for manufacturing a contactless chip card or smartcard or "integrated-circuit card" according to the present invention advantageously makes it possible to combine the low cost of conventional techniques for embedding a conductive wire using ultrasound to form a radiofrequency antenna, typically a high-frequency radiofrequency antenna for implementing NFC communications, and the flexibility of use of surface-mount devices, which flexibility is due to the wide variety thereof, to miniaturization thereof or even to the less strict constraints thereof in respect of the PCB substrate.

Although the card is said to be "contactless", i.e. capable of communication via a high-frequency link, typically at 13.56 MHz (RFID or NFC), it may also be provided with conventional contact-based communication means.

In the examples described hereinafter, reference is made, by way of illustration, to a module, comprising such surface-mount devices (SMDs), that performs an electronic NFC-energy-harvester function. The invention is however applicable to any type of module comprising SMDs performing one or more electronic functions.

One major advantage of a module dedicated only to NFC energy harvesting is that it allows this electrical energy to be made available to other components. It is thus possible to incorporate, into the card, any number of active-device modules, LEDs for example, to be supplied with power by this NFC-energy-harvester module.

Such an SMD module is devoid of memory or microprocessor or microcontroller, and forms a voltage-rectifying circuit, typically a full-wave bridge rectifier, that converts the AC voltage resulting from the NFC energy transferred when the NFC antenna is in proximity to an NFC reader.

Although the following description relates mainly to harvesting NFC energy and making the latter available to active-device modules, other electronic modules (chip, microprocessor, etc.) exploiting the contactless (or even contact-based) communications may also be present in the card though they have not been illustrated below.

Figure 1:
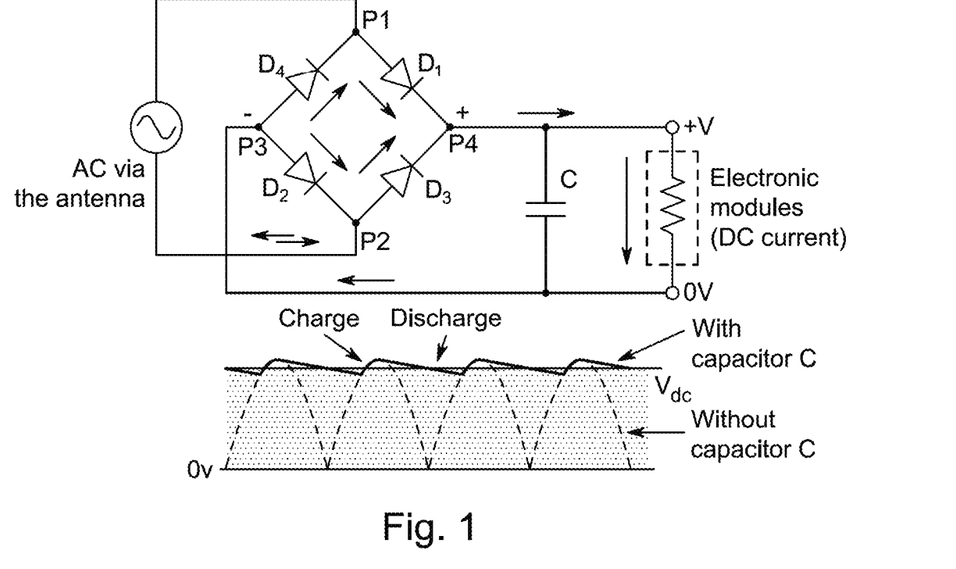
FIG. 1 illustrates a full-wave bridge rectifier or "full-wave diode bridge rectifier".

FIG. 1 illustrates a full-wave bridge rectifier or "full-wave diode bridge rectifier". As is conventionally the case, it comprises four diodes D1 to D4 mounted to form a bridge.

The common point between the back-to-back diodes D1 and D4 and the common point between the back-to-back diodes D2 and D3 form two input terminals P1, P2 for the AC signal output by the NFC antenna. The two other points of the bridge form the two output terminals P3 (negative terminal), P4 (positive terminal) of the rectified DC signal.

Optionally, a smoothing capacitor C is connected in parallel to the output terminals P3 and P4, so as to smooth the DC voltage as illustrated in the signal waveform shown in the figure. For a rectified NFC signal, a capacitance higher than 100 pF, or even 150 pF, may be suitable.

Figure 2:
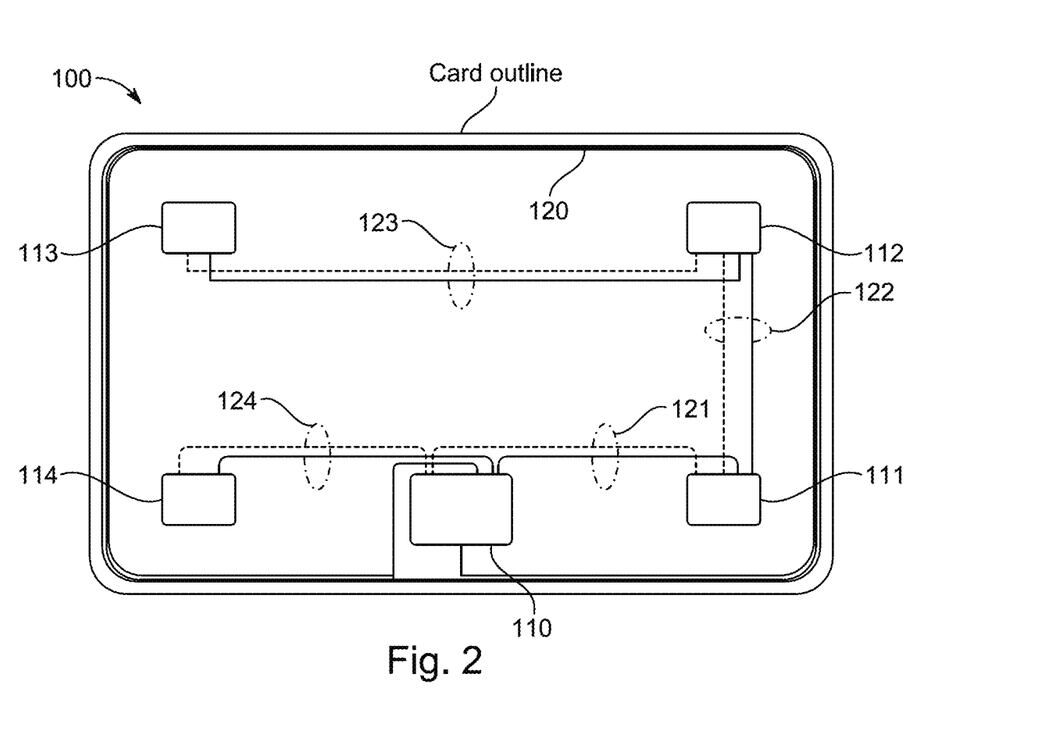
FIG. 2 schematically illustrates a contactless chip card according to embodiments of the invention.

FIG. 2 schematically illustrates a contactless chip card 100 according to embodiments of the invention.

The chip card 100 for example has the ID-1 dimensions of a credit card, i.e. dimensions such as defined in standard ISO/IEC 7810, namely 85.60×53.98×0.76 mm. Of course, other formats may be envisaged.

The card 100 comprises a substrate or carrier-body 101 formed from a material able to receive a conductive wire via ultrasound embedment. This material may be a plastic, typically ABS—acrylonitrile butadiene styrene, PVC—polyvinyl chloride, PC—polycarbonate, PET—polyethylene terephthalate, PEEK—polyetheretherketone, or PEN—polyethylene naphthalate. The substrate houses, in a punch, a printed-circuit module 110 of rectifying-circuit type incorporating one or more surface-mount devices, and optionally one or more other active-device modules 111-115, such as LED or OLED modules, also placed in punches or cavities produced by machining or an equivalent technique and electrically connected to the rectifying module 110.

The example of the figure illustrates two LED modules 111, 112 and two modules 113 and 114 forming OLED panels. Of course, a different number of (one or more) active-device modules may be provided, as may modules of nature other than LED and OLED modules, micro-sensor modules for example. Likewise, their spatial arrangement in the plane of the card 100 may be different from that illustrated in the figure.

The wire radiofrequency antenna 120 required for contactless NFC communication is formed from a conductive wire embedded or encapsulated in the bulk of the substrate 101, using conventional ultrasound-based techniques. As is conventionally the case, the conductive wire is encircled by an electrically insulating cladding. The wire may be embedded directly into the plastic forming the substrate or coiled then integrated into the latter. Thus, the conductive wire typically forms a plurality of loops. The ends of the conductive wire 120 are placed on the terminals P1, P4 associated with the rectifying module 110 and are soldered to said terminals. Thus, the antenna is coupled to the rectifying module 110.

A pair of electrical links 121-124 is also provided between the rectifying module 110 and each of the active-device modules 111-114. Each pair may be formed from conductive wires that are also embedded into the bulk of the substrate 101. As a variant, certain pairs may be deposited (printing, etching) directly on the substrate.

The conductive wire is preferably an enameled copper wire of 112 or 130 μm diameter.

When the card 100 is brought into the vicinity of an NFC reader, magnetic coupling (induction) of their antennas allows the card to be supplied with electrical power by the reader. This electrical power is AC, and generally of 13.56 MHz frequency. The rectifying module 110 operates as illustrated in FIG. 1, to rectify the AC electrical signal received across the terminals P1 and P2 into a rectified electrical signal across the terminals P3 and P4 that may be considered to be a substantially DC signal. These terminals P3 and P4 supply power to the pairs of electrical links 121-124 and therefore to the active-device modules 111-114.

Figure 3:
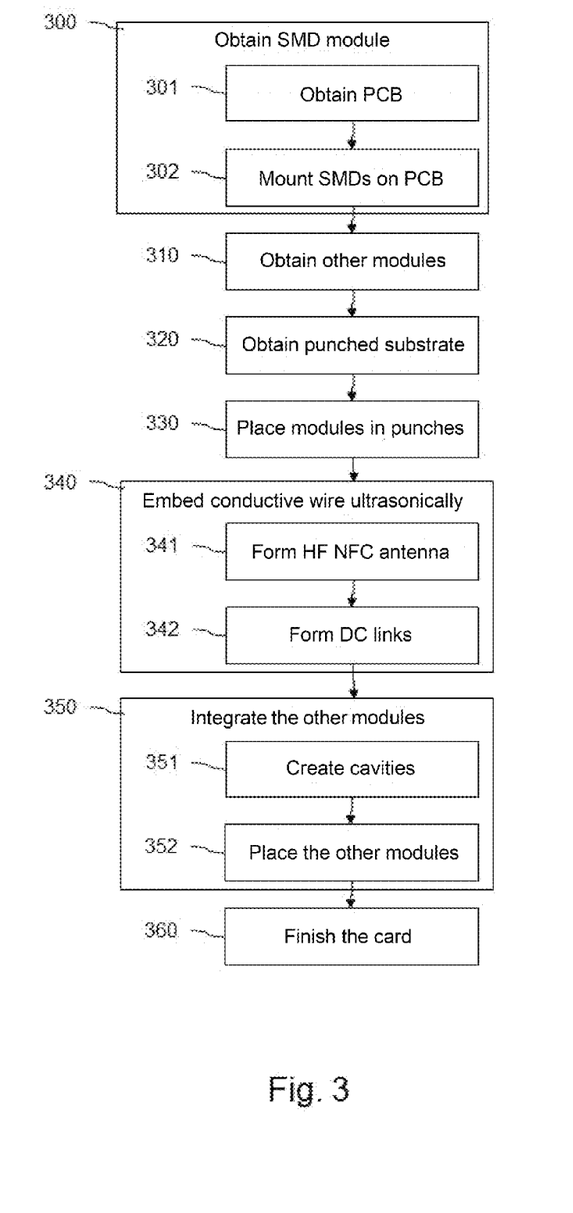
FIG. 3 illustrates, using a flowchart, steps of a process for manufacturing a contactless chip card, according to embodiments of the invention.

FIG. 3 illustrates, using a flowchart, steps of a process for manufacturing a contactless chip card 100. This process is described also with reference to FIGS. 4a to 4h, which schematically illustrate manufacture step-by-step of this chip card.

In step 300, a printed-circuit module incorporating one or more surface-mount devices (SMDs) is obtained. In the above example, the rectifying module 110 is obtained, which is composed of four diodes D1 to D4 and of a capacitor C, in addition to the terminals P1 to P4.

Figure 4A:
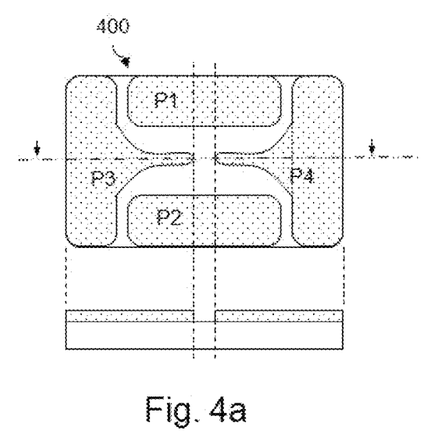
FIGS. 4a to 4h schematically illustrate the step-by-step manufacture of a contactless chip card, according to embodiments of the invention.

In detail, a PCB module 400 is initially obtained in step 301, as illustrated for example in FIG. 4a. The dimensions of the PCB module 400 may for example match those of conventional chip-card modules, namely 5.1×8.0 mm, so that existing industrial tools may be reused. Of course, other dimensions are possible in the context of the invention.

Such as illustrated in FIG. 4a, the PCB module 400 already comprises a metallization layer (produced using conventional techniques) that is typically made of copper, and that is deposited on a substrate, typically of FR4 or a polyimide-based substrate. The metallization layer forms four metal terminals P1 to P4 that are insulated from one another. In this example, each terminal takes the form of substantially rectangular metal lands, along one of the sides of the PCB module 400, which is of rectangular shape.

The input terminals P1, P2 are placed along the two long sides of the PCB modules; the output terminals P3, P4 are placed along the two short sides of the PCB module. The inverse is possible.

The terminals along the two short sides of the PCB module extend over the entirety of the length of the sides, whereas the terminals along the two long sides of the PCB module extend over only a central segment of their length. The inverse is also possible. Other spatial configurations of the terminals are also possible.

The output terminals P3, P4 have two respective arm-shaped extensions extending towards the centre of the PCB module 400.

Optionally, nickel may be electroplated on the PCB module 400 in order to deposit or plate a thin layer of nickel on the terminals P1 to P4, and thus improve the resistiveness and durability of the PCB module 400.

Figure 4B:
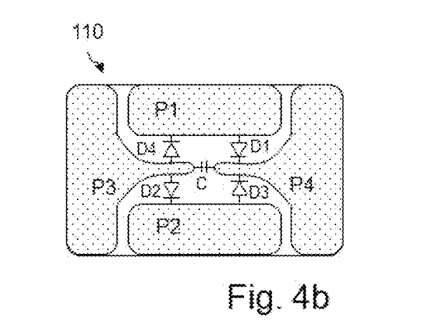

The SMDs, here the diodes D1 to D4 and the optional capacitor C, are mounted on the PCB module 400 in step 302. Conventional techniques are used here to solder the pins of the components. Such as illustrated in FIG. 4b, one diode is surface-mounted between each pair of terminals P1 to P4 in accordance with the bridge diagram of FIG. 1. Furthermore, the capacitor C is soldered between the two terminals P3 and P4, and preferably between the end portions of their extensions towards the centre of the PCB module 400.

At the end of step 302, the rectifying module 110 is obtained.

In step 310, one or more other electronic modules to be mounted on the chip card 100 may be obtained, using similar techniques to those of step 300 or using other techniques. These electronic modules for example comprise active components.

Figure 4C:
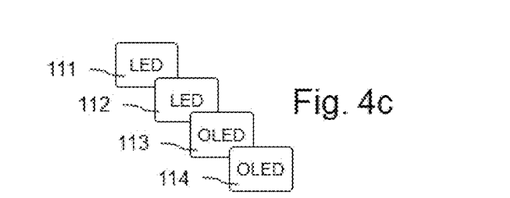

In the example of FIG. 2, two LED modules 111, 112 and two OLED modules 113, 114 are obtained as shown in FIG. 4c. Once again, these modules may have standard dimensions (5.1×8.0 mm) or any other dimensions.

In step 320, a card substrate or carrier-body or inlay or prelam or "pre-laminated layer" 410 is obtained, which contains one or more (generally blind) punches 411, 412 or holes dimensioned to receive all or some of the aforementioned modules.

In particular, a punch 411 is provided to receive the rectifying module 110 obtained in step 300. It therefore has standard dimensions of 5.1×8.0 mm.

Each punch may be formed using conventional techniques: mechanical removal of material (e.g. milling), machining, removal by laser, removal via chemical processing, etc. Typically, the depth of the cavity forming the punch is substantially equal to the thickness of the module to be inserted therein, and for example equal to 150 μm, noting that the thickness of the core substrate of the card is about 300 μm.

Figure 4D:
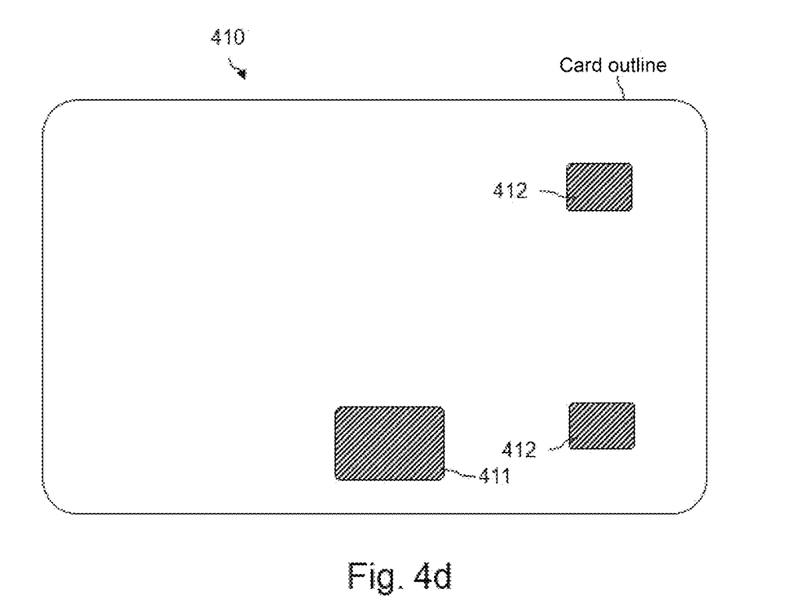

In the example of FIG. 4d, one punch 411 is provided to receive the rectifying module 110, and two punches 412 are provided to receive the LED modules 111, 112.

Figure 4E:
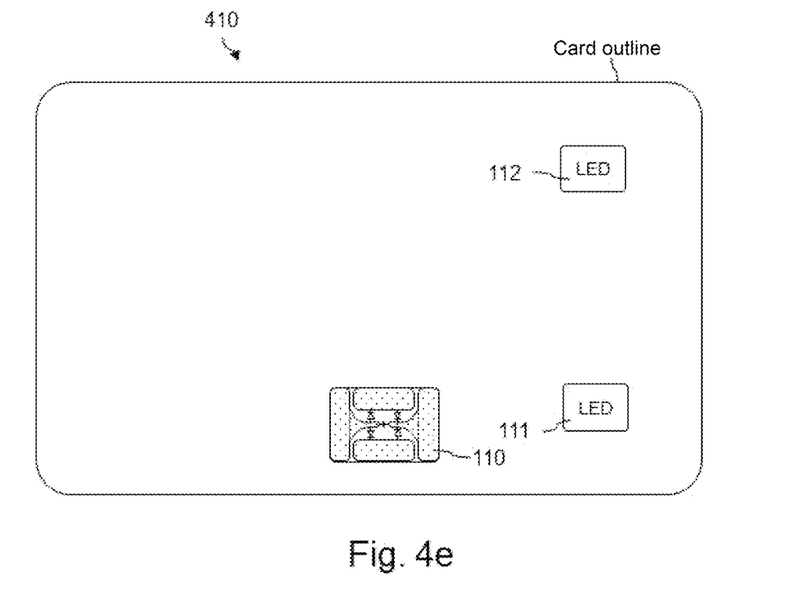

In step 330, these modules, and therefore the rectifying module 110 and the LED modules 111, 112, are placed in the corresponding punches 411, 412 provided in the substrate 101. This placement is illustrated in FIG. 4e.

In step 340, a copper conductive wire is embedded in the bulk of the substrate 410 to form the NFC radiofrequency antenna, connect it to the rectifying module 110 and connect all of the provided modules to this rectifying module 110, which is the DC power source of said modules.

The conductive wire may be embedded using any conventional ultrasound-based technique, and especially using a sonotrode.

Figure 4F:
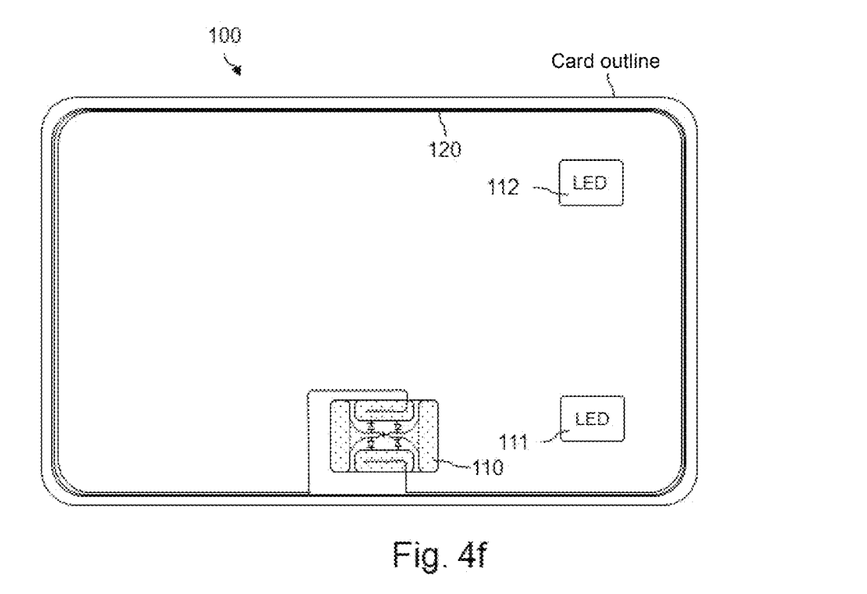

In detail, in step 341, a conductive wire 120 coiled to form multiple turns is encapsulated in the bulk of the substrate 410, and the ends thereof are placed on the input terminals P1 and P2 of the rectifying module 110. These ends are then soldered to the terminals. This conductive wire forms the wire RF antenna of the card, as illustrated in FIG. 4f.

In step 342, conductive wires are also encapsulated in the bulk of the substrate 410 to form DC (direct current) electrical links between the rectifying module 110 and the other modules already placed in the card, but also to the sites of other modules (the OLED modules 113, 114) to be provided subsequently. One pair of wires is provided for each module.

Figure 4G:
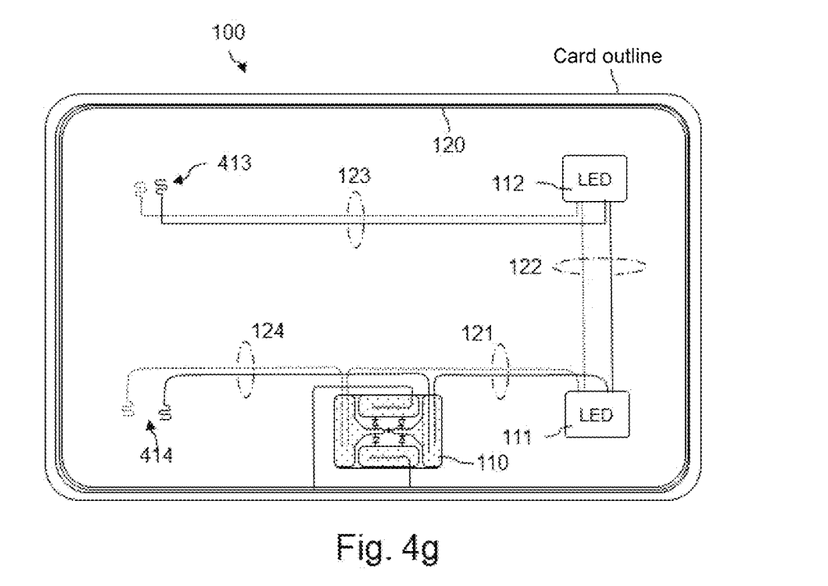

The pairs of electrical links may cascade, from one module to the next, as illustrated in FIG. 4g, by the links 121 (between the rectifying module 110 and the LED module 111), 122 (between the LED module 111 and the LED module 112) and 123 (between the LED module 112 and the site 413 where the OLED module 113 will be placed) and/or run in parallel from the rectifying module 110, as illustrated by the links 121 (between the rectifying module 110 and the LED module 111) and 124 (between the rectifying module 110 and the site 414 where the OLED module 114 will be placed). In particular, all of the links 121 to 124 may run in parallel from the rectifying module 110.

Similarly to step 341, the end of each wire ending on a module already in place (rectifying module 110 or LED module 111, 112) is placed on the corresponding contact terminal and soldered thereto.

The ends of wires ending on the sites 413, 414 intended to subsequently receive other modules may for example have a contact land or interconnect region formed by zigzags (or closely spaced alternations) of the conductive wire.

At the end of step 342, a "semi-finished" chip card is obtained.

In step 350, any other modules (OLED modules 113 and 114 in the example) are integrated into the card. This for example comprises, in step 351, producing, at the sites 413 and 414, cavities with the dimensions of these other modules, to accommodate them.

The contact lands made from conductive wires and embedded in the substrate are laid bare during the creation of the cavities, by any known means, and especially a mechanical means, machining or removal by laser, or chemical or heat-based attack.

Next, in step 352, the other modules are placed in these cavities using any suitable mounting technique, for example one based on conductive or ACF films or adhesives.

Figure 5:
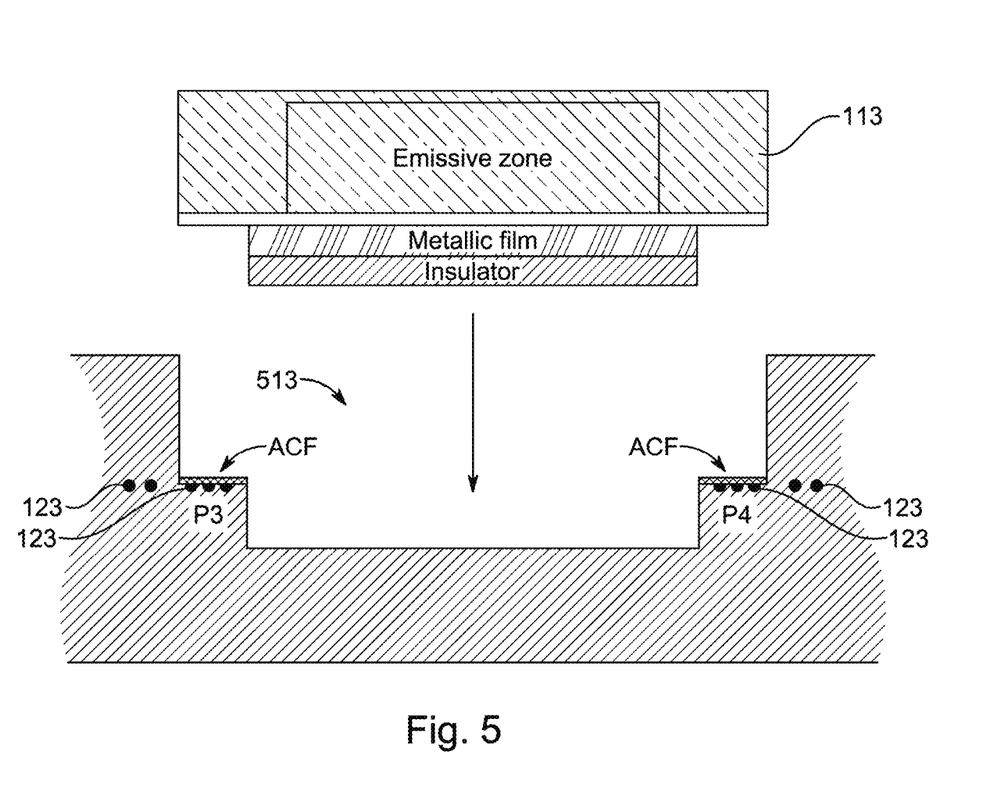
FIG. 5 schematically illustrates a module, typically an OLED module, being mounted using an ACF technique.

In this regard, the OLED modules 113 and 114 are mounted using an ACF technique as illustrated in FIG. 5. In this figure, the cavity 513 with the dimensions of the OLED module 113 is formed by destructively machining the substrate 101 so as to lay bare the contact lands P3 and P4 of the conductive wire 123 (these lands being given the references P3 and P4 because they are connected to lands P3 and P4 of the rectifying module 110, respectively). An ACF film is deposited on these contact lands before the OLED module 113 is inserted, thus making the electrical connection between the module and the contact lands.

This figure also illustrates that the depth of embedment of the conductive wires used to form the contact lands may be adjusted to the z-dimensions (height) of the module to be inserted. This adjustment is for example obtained by modifying the power of the ultrasounds emitted by the sonotrode.

Figure 4H:
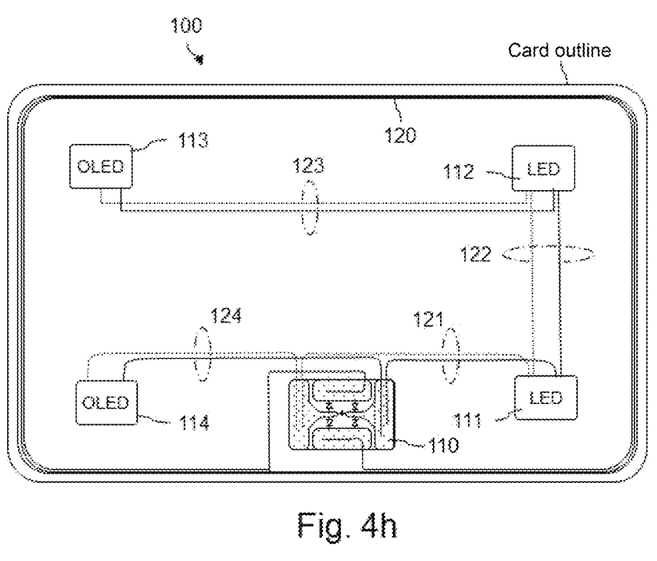

At the end of step 352, the "semi-finished" chip card of FIG. 4h (similar to FIG. 2) is obtained.

The process of FIG. 3 ends with step 360 of finishing the card. This step may encompass a high number of operations, carried out fully or partially.

It may for example comprise adding other electronic modules, typically a microprocessor module connected to the antenna 120 or to another antenna to communicate with the NFC reader.

It may also comprise laminating one or more protective and/or finishing layers on both sides of the semi-finished chip card. These layers may comprise visual elements for personalizing the chip card.

It may also comprise printing visual personalizing elements on the chip card.

A contactless chip card according to the invention thus provides a way of harvesting RF NFC energy from a bulk-encapsulated and embedded wire RF antenna, that is capable of providing, as output, DC current to any number of integrated electronic modules, typically LEDs, operating on DC current. Thus, the constraint of known techniques, which require one rectifying diode per LED to be mounted on the same module, is avoided. Moreover, this modular approach allows modules such as OLED panels to be integrated easily.

Although the invention has been described above with reference to specific embodiments, the present invention is not limited to the specific embodiments, and modifications, that fall within the scope of the present invention, will be obvious to those skilled in the art.

Many other modifications and variations will become clear to those skilled in the art on referring to the above illustrative embodiments, which are given merely by way of example and which do not limit the scope of the invention, said scope being defined solely by the appended claims. In particular, the various features of the various embodiments may be exchanged, where appropriate.

In the claims, the word "comprising" does not exclude other elements or steps, and the indefinite article "a" or "an" does not exclude a plurality. The simple fact that different features are mentioned in different mutually dependent claims does not indicate that a combination of these features cannot be used advantageously.

The invention claimed is:

1. A method for manufacturing a contactless chip card of a type employing near-field communication, comprising:
   obtaining a voltage-rectifying-circuit-forming printed-circuit module incorporating one or more surface-mount devices;
   placing the voltage-rectifying-circuit-forming printed-circuit module in a punch of same size provided in a substrate; and then,
   forming, by embedding conductive wires in a bulk of the substrate, a wire radiofrequency antenna ends of which are soldered to terminals associated with the voltage-rectifying-circuit-forming printed-circuit module, and electrical links between the voltage-rectifying-circuit-forming printed-circuit module and one or more active-device modules.

2. The method according to claim 1, wherein the voltage-rectifying-circuit-forming printed-circuit module is devoid of memory or microprocessor or microcontroller.

3. The method according to claim 2, wherein the surface-mount devices form a full-wave bridge rectifier.

4. The method according to claim 2, wherein the formation of the wire radiofrequency antenna comprises embedding a conductive wire in the bulk of the substrate, the ends of the conductive wire being placed on the terminals associated with the printed-circuit module, then soldered to said terminals.

5. The method according to claim 2, wherein one of the active-device modules is placed in a punch provided to this end in the substrate, before embedment of a conductive wire forming the electrical link with the voltage-rectifying-circuit-forming printed-circuit module.

6. The method according to claim 2, wherein one end of an embedded conductive wire forming one electrical link is laid bare in a cavity of the substrate before one of the active-device modules is placed therein.

7. The method according to claim 1, wherein the surface-mount devices form a full-wave bridge rectifier.

8. The method according to claim 7, wherein the formation of the wire radiofrequency antenna comprises embedding a conductive wire in the bulk of the substrate, the ends of the conductive wire being placed on the terminals associated with the printed-circuit module, then soldered to said terminals.

9. The method according to claim 1, wherein the formation of the wire radiofrequency antenna comprises embedding a conductive wire in the bulk of the substrate, the ends of the conductive wire being placed on the terminals associated with the printed-circuit module, then soldered to said terminals.

10. The method according to claim 1, wherein one of the active-device modules is placed in a punch provided to this end in the substrate, before embedment of a conductive wire forming the electrical link with the voltage-rectifying-circuit-forming printed-circuit module.

11. The method according to claim 1, wherein one end of an embedded conductive wire forming one electrical link is laid bare in a cavity of the substrate before one of the active-device modules is placed therein.

12. The method according to claim 1, wherein one or more active-device modules comprise at least one light-emitting diode, which is organic.

13. The method according to claim 1, wherein one or more active-device modules comprise at least one light-emitting diode, which is not organic.

14. A contactless chip card of a type employing near-field communication, comprising:
   a substrate,
   a voltage-rectifying-circuit-forming printed-circuit module incorporating one or more surface-mount devices and placed in a punch of same size provided in the substrate; and
   one or more active-device modules,
   wherein a wire radiofrequency antenna is formed from a conductive wire embedded in a bulk of the substrate and ends of which are soldered to terminals associated with the voltage-rectifying-circuit-forming printed-circuit module, and
   wherein electrical links are formed between the voltage-rectifying-circuit-forming printed-circuit module and one or more active-device modules, by conductive wires embedded in the bulk of the substrate.

15. The contactless chip card according to claim 14, wherein the surface-mount devices form a full-wave bridge rectifier.

16. The contactless chip card according to claim 15, wherein one or more active-device modules comprise at least one light-emitting diode, which is organic.

17. The contactless chip card according to claim 15, wherein one or more active-device modules comprise at least one light-emitting diode, which is not organic.

18. The contactless chip card according to claim 14, wherein one or more active-device modules comprise at least one light-emitting diode, which is organic.

19. The contactless chip card according to claim 14, wherein one or more active-device modules comprise at least one light-emitting diode, which is not organic.

* * * * *